United States Patent [19]
Heidhues

[11] Patent Number: 6,032,203
[45] Date of Patent: Feb. 29, 2000

[54] SYSTEM FOR INTERFACING BETWEEN A PLURALITY OF PROCESSORS HAVING DIFFERENT PROTOCOLS IN SWITCHGEAR AND MOTOR CONTROL CENTER APPLICATIONS BY CREATING DESCRIPTION STATEMENTS SPECIFYING RULES

[75] Inventor: Peter Albert Heidhues, Aukrug, Germany

[73] Assignee: General Electric Company, Schenectady, N.Y.

[21] Appl. No.: 08/834,569

[22] Filed: Apr. 7, 1997

[51] Int. Cl.[7] .......................... G06F 13/10; G06F 13/42; G06F 15/163
[52] U.S. Cl. ........................ 710/11; 710/30; 710/65; 709/230; 709/232; 709/236; 709/302
[58] Field of Search .................... 709/230, 232, 709/236, 302; 710/105, 8, 11, 30, 65

[56] References Cited

U.S. PATENT DOCUMENTS

| | | | |
|---|---|---|---|
| 5,414,812 | 5/1995 | Filip et al. | 707/103 |
| 5,428,555 | 6/1995 | Starkey et al. | 364/528.1 |
| 5,471,596 | 11/1995 | Brown, III | 707/103 |
| 5,630,101 | 5/1997 | Sieffert | 395/500 |
| 5,634,010 | 5/1997 | Ciscon et al. | 709/223 |
| 5,652,911 | 7/1997 | Venrooy et al. | 395/80 |
| 5,687,373 | 11/1997 | Holmes et al. | 709/302 |
| 5,768,119 | 6/1998 | Havekost et al. | 364/133 |
| 5,793,954 | 8/1998 | Baker et al. | 709/250 |
| 5,828,576 | 10/1998 | Loucks et al. | 324/118 |

Primary Examiner—Thomas C. Lee
Assistant Examiner—Ilwoo Park
Attorney, Agent, or Firm—Cantor Colburn LLP; Carl B. Horton

[57] ABSTRACT

An interface system for use in switchgear and motor control center applications so that communications may occur between different field devices and process control computers using different protocols and requiring different data formats. The interface system translates fieldbus protocols and data formats using a changeable communication driver module employing a description language defining pieces of data called "telegrams." The telegrams contain object structures related to the communication processor or protocol used by the field devices and process control computers. The system also allows for dynamic configurations given the changeable communication driver.

12 Claims, 8 Drawing Sheets

SYSTEM FOR INTERFACING BETWEEN A PLURALITY OF PROCESSORS HAVING DIFFERENT PROTOCOLS IN SWITCHGEAR AND MOTOR CONTROL CENTER APPLICATIONS BY CREATING DESCRIPTION STATEMENTS SPECIFYING RULES

FIELD OF THE INVENTION

This invention is directed to an interface system for use in switchgear and motor control center applications so that communications may occur between different controllers and process computers using different protocols and requiring different data formats.

BACKGROUND OF THE INVENTION

In an electrical distribution system of a large facility, switchgear is the connection between the power source and the circuits that distribute power to the equipment. The switchgear is an assembly containing electrical switching, protection, metering and management devices for industrial, commercial, and utility applications. A motor control center is a switchgear application designed to control and protect a large facility's motors. Plant supervisory management systems or Programmable Controllers (PC), or Programmable Logic Controllers (PLC) are process control systems which control electrical switching, protection, metering and management devices in switchgear applications. PCs, PLCs and plant supervisory management systems communicate directly with the devices or processes such as pushbuttons, switches, sensors, control alarms, and starters. The information supplied to the process control systems may include data about each circuit such as status data, current and voltage in each phase of a multi-phase distribution system, electric power, phase angle, trip setting of the circuit breaker, and current reached during trip events. The data can be in the form of discrete inputs/outputs (I/O) such as ON/OFF, or open/closed, as well as data I/O such as current outputs, and voltage outputs.

In a typical switchgear installation, there is a need for communication between different control systems and processors from various manufacturers and utilized in the installation. Historically, process computer manufacturers have developed fieldbus protocols and data structures without regard to standardization. As used herein, the term Fieldbus means special form of local area network dedicated to applications in the area of data acquisition in an industrial or manufacturing facility. The network may, for example, be a digital, bi-directional, multi-drop, serial-bus, communications network used to link isolated field devices such as controllers, transducers, actuators, and sensors on the factory floor. Protocols are implemented in process computers to effect the orderly exchange of information between the components. Standardization of protocol convention typically determines the nature of the data representation, the format of the data representation over a communication path, and the sequence of any control message that are to be sent. The procedure of the standard protocol must be maintained by both destination computers in a communication link.

Since many manufacturers have not adopted standard protocols, as explained above, and in order to achieve compatibility between the various incompatible data formats from different manufacturers, switchgear systems have often relied on firmware residing in the PLCs or a separate interface system to communicate with the PLCs and the devices. The firmware is tailored to interface between the various incompatible systems operating at varying data rates and with varying data formats. For example, one system only accepts small "chunks" of data of less than 16 bits because of its limited communications capability, whereas other control systems require a minimum data length of 16 bits for each data chunk. Some control systems supply data and instructions in only one bit, e.g., for switch ON/OFF, whereas the field devices need two bits for switching. There is also a need to tailor the data to meet the customers' specific requirements such as cutting off overhead data so as to display only certain amount of data, or transmitting/displaying data in a particular format. Some customers are only interested in status bits, such as whether the drives in the system are ON/OFF or tripped. Other customers need to know the currents because of the extra maintenance functions implemented in their plant supervisory management system. In addition, when new units are added to the system or existing units are changed, it often becomes necessary to redo the firmware package with the firmware being reprogrammed or enhanced by a lengthy process including a complete test and verification cycle. This results in many incompatible, and sometimes unmanageable, firmware releases to meet the customers' special applications.

From the vendors' point of view, it is desirable to build a data selector/formatter, i.e., an interface system between the process control computers and the devices, without having to make multiple modifications and test and verification programming cycles, which system also enables customers to specify the amount of information to be provided and the data formats needed. By transferring only requested data via the interface system, the load on the plant supervisory management system can be reduced.

Therefore, it is an objective of the present invention to provide a communication interface driver for switchgear applications which is an application-independent module for separating the communication interface drivers from the application software, and for selecting and translating data exchanged between the field devices and the process control computers.

It is another object of the present invention to provide a communication interface system which is based on communication objects such as data and function objects.

A still further object and advantage of the present invention is a dynamic and open configurable interface system for switchgear applications with interchangeable sets of communication and interface driver modules.

SUMMARY OF THE INVENTION

These and other objects and advantages may be achieved by an interface system for a switchgear application which can be configured on a job-by-job basis to accommodate the different incompatible equipment. The interface system, in one embodiment, translates the fieldbus protocols and formats the data using a changeable driver module employing a description language defining pieces of data referred to herein as "telegrams." The telegrams contain object structures related to the communication processor or protocol used by the field devices and process control systems as well as customer requirements. As such, the interface system can pass information between the connected systems by converting exchanged data into a format with the necessary conventions used by the connected systems and which satisfies the customer specifications.

The above-described interface system provides dynamic configuration with the independent application driver module for interpreting the telegrams employing a description language, allowing exchanges with a new set of driver module employing new description languages supporting new configurations of the switchgear system.

DETAILED DESCRIPTION OF THE INVENTION

The following detailed description includes four sections. The first section describes the basic hardware of an exemplary switchgear application in which one form of the present invention can be employed. The second section is an overview of the structure of an interface system in accordance with one embodiment of the present invention. The third section describes the implementation process, and the fourth section describes the enabling scheme to dynamically reconfigure the system described in the second section.

1. Control System Hardware Connections

Figure 1:
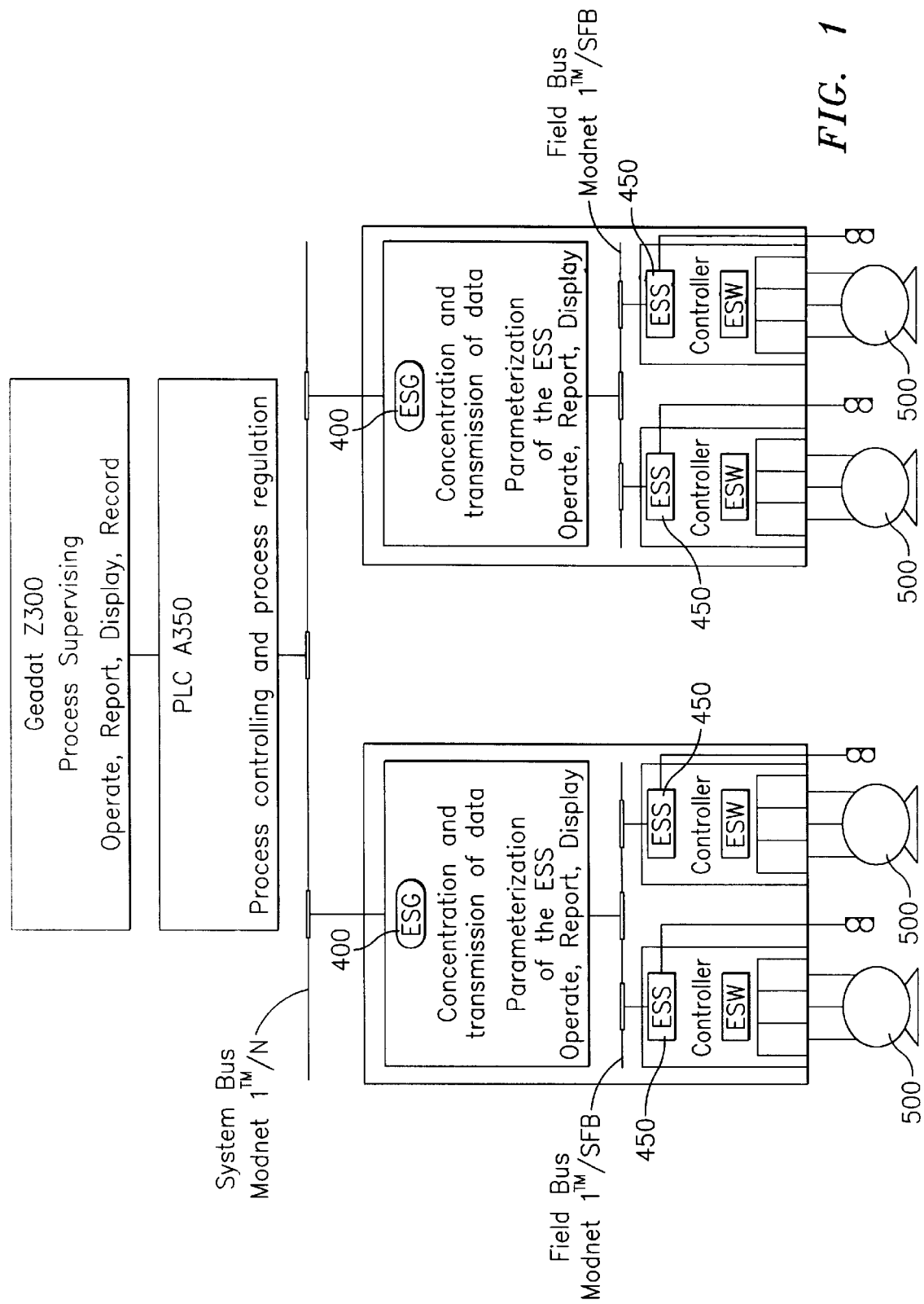
FIG. 1 is a block diagram of an exemplary control system of a switchgear installation in accordance with one embodiment of the present invention.

FIG. 1 is a block diagram of an exemplary structure of a control system in a switchgear application, such as a low voltage switchboard. The structure is hierarchical and similar to the hierarchy of an energy distribution system which typically begins at the transformer level down to the next level with the feeder, and then to the circuit branches. In the control system shown in FIG. 1, the highest level is the process level 300 with the control board and the next level is the plant supervisory management system level 350, to which group terminals (ESG) 400 are connected. At the lowest branch level are the branch controls or field devices (ESS) 450 such as trip units, connected to motors 500. As used herein, the term Field device means physical device which implements a virtual field device. The term Virtual field device means that part of a field device in an application process which is communicable such as variables, programs, and data ranges. The group terminals ESG 400 and the PLCs can be housed together in a switchboard forming a local unit. Branch devices ESS 450 may be mounted along with current transformer units in draw-out units in the same switchboard configuration.

In the exemplary structure, the connection from the branch devices to the terminals 400 is via serial links, using the fast fieldbus MODNET 1™/SFB commercially available from AEG NTG GmbH & Co. KG of Germany (hereafter "AEG KG") operating at a transfer rate of 375 Kbit/sec and transmitting switching commands to the branch devices 450 as well as data concerning the operating status of the individual branches 450 back to the terminals 400. The connection between the terminals 400 and the process control system 350 employs the GEAMATICS™ bus system MODNET 1™/N also commercially available from AEG KG of Germany. The plant supervisory management system may be process control computers such as General Electric Company's Power Management Control System PMCS™, Siemens Teleperm M Distributed Control System, Siemens PLC S5, or Group Schneider AEG Modicon A series PLC. Some of the tasks performed by the interface system 400 include: gathering, storing, and transmitting data from the individual devices ESS 450 at the control and/or process level, as well as directing commands or control functions in the reverse direction, i.e., from the process control computers 350 to the individual devices ESS 450 to protect connected motors 500 according to specific control, protection, and interlock strategies.

It is necessary to have a gateway, or an "interface system," resolving the compatibility problem with the protocol related structures, i.e., specifications for a group of data in specific formats sent by one computer platform, between the various incompatible microprocessor-based computers in the system in a typical switchgear application as described above. The group terminal ESG 400 fulfills this role as the interface system between the devices and the plant supervisory management computers by performing the following tasks: (a) selecting and formatting data and instructions between the field devices and the process control computers; (b) storing data; (c) handling alarms (warning and fault conditions); (d) operating the field devices through instructions from the process control computers; (e) displaying messages; and (f) allowing input of parameter data. For example, the group terminal ESG 400 collects data such as current value and status bits ("communication objects") from two field devices ESS 450 via two communication channels. In this configuration, ESG 400 reads the current value every second. The field device ESS 450 sends the status bits to the ESG 400 each time there is a change in the data. The group terminals ESG 400 are equipped to display messages, status of the branch devices, and warning alarms, as well as to accept data entry with a display and keyboard unit to program the connected devices ESS 450 with specific operating or control parameters.

2. Interface System—Software Structure

Figure 2:
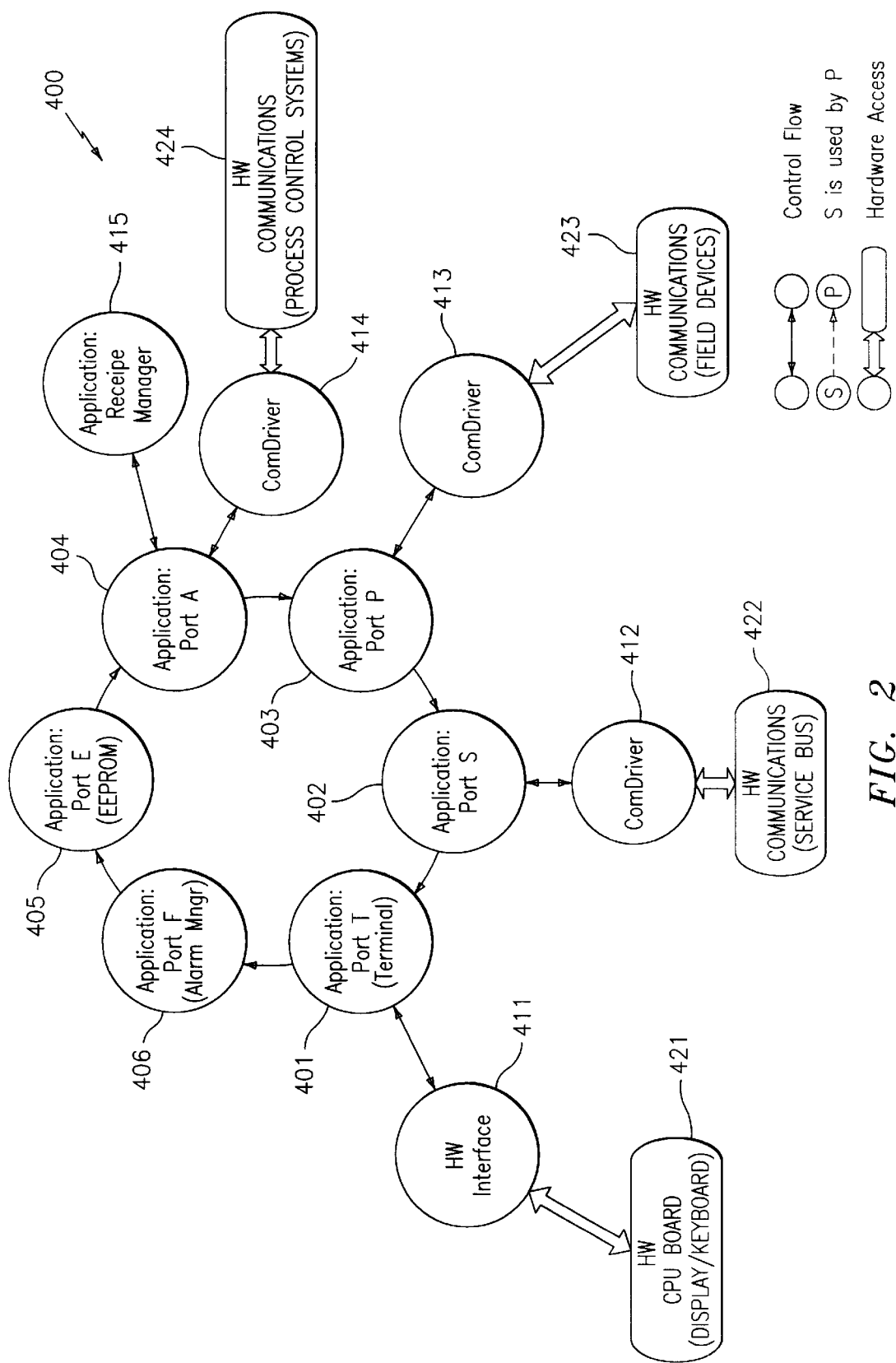
FIG. 2 is software data flow diagram illustrating an interface system in accordance with one embodiment of the present invention.

An overview of an exemplary software architecture of the interface system built-into each group terminal ESG 400 is illustrated in FIG. 2. The overview disclosed here for illustrative purposes shows the various elements in the group terminal ESG 400 in accordance with one embodiment of the present invention. The hardware interface 411 of Application Port T (Terminal) 401 allows the customers to customize the parameters of the protection modules such assigning limits to each faults, current threshold values, trip characteristics, etc. using the ESG's display/keyboard 421. Communication driver 413 interfaces with field devices through Application Port P 403 and via a hardware interface such as the serial interface RS-485 required for Modbus™ RTU. Communication driver 414, employing a specific communications protocol supported by the process control system 350, interfaces with the communication hardware 424 through Application Port A 404. Communication driver 412 supports the field bus data link 422 through Application Port S 402 and via a serial interface such as an RS-232 for standard personal computer systems. Application Port F 406 handles all alarms for warnings and fault conditions. Application Port E 405 stores ESG configuration data and a copy of each ESS configuration in EEPROM. Firmware with boot code as stored in EPROM is not shown on the diagram. Application Receipe Manager™ 415 interfaces with Application Port A 404, and as described below, provides many of the interface functions.

The Receipe Management Interface System

The dynamic configurable interface system of the present invention is in the Receipe Management Interface System, which Application Receipe Manager 415 of FIG. 2 is a part of. The term "Recipe" is primarily used conjunction with batch processes in the food and beverage processing industry. In this context, a recipe is a definition of a control sequence as normally applied to a continuous process control application, which may include the formulae, equipment requirements, and procedures as specified by the control program. Variation of any of the components of the recipe will by definition vary the end result of the food or beverage product. The dynamic configurable interface system is based on the recipe model and the object-oriented programming concept which functions as a gateway and the data selector/translator between the field devices and the control computer. There are three main elements to this interface system namely, a library of "receipes," the Receipe Manager™ module, and an event/data handling module.

On a continuous basis, field device ESS 450 sends and receives from the group terminal ESG 400 "data chunks." The process control system through ESG Application Port A also sends and receives "data chunks" from the group terminal ESG 400. The data chunks are called "telegrams" within the context of this invention. The telegrams can be raw data as coming from the devices or control systems, or formatted data meeting the requirements of a particular process control system or the corresponding field device. There are programming modules in the interface system to select, store, translate, format and forward the telegrams from the field device to the process control system, or vice versa.

The "Receipe" Library

The Receipe is a description program with a set of "rules" for the interface system, specifying how to format and/or translate data in the "telegrams" to capture the customer's particular requirements for specific data formats and selection, as well as the necessary computation/mapping to accommodate the process control system and the corresponding field device protocols. The Recipe is stored in an array comprising a library of receipes. Each receipe comprises a list of description language statements or "objects." Each description further comprises a list of blocks and functions as "objects." Each block is a single piece of raw data as provided by the field devices or the process control system, or a piece of data constructed per certain format requirements. Bit containers can also be defined as blocks. Examples of blocks are currents, operating hour, and a command word such as ON/OFF. The functions here are logical and arithmetic functions to perform on a given data type to construct or create a block. Each receipe object includes an object descriptor part which identifies the object, and a data part which contains the object data, e.g., a constant value or a variable reference.

The syntactically correct list of telegram description language objects (i.e., blocks and functions) making up a receipe includes the following types of objects:

Variable Object: Object Descriptor/Parameter/Block ID
Constant Object: Object Descriptor/Parameter/Constant Value
Array Object: Object Descriptor/Parameter/Parameter/Block ID
Function Object: in two formats. Format 1) Object Descriptor/Object (for operators with one parameter, e.g., −128); OR Format 2) Object Descriptor/Object/Object (for operators with two parameters, e.g., Add (2,2)).

Limitations: Function Objects and Parameter Objects must be of the same type.
Where Object Descriptors are set forth in the following table:

| Object Type: 0 . . . 15 | Field Indicator: 0 . . . 1 | Data Type Specification: 0 . . . 4 |
|---|---|---|
| Bit 7 . . . 4 | Bit 3 | Bit 2.0 |

Object Types are set forth in the following table:

| Index | Obj. Descr. |
|---|---|
| 0 | Constant |
| 1 | Variable |
| 2 | Swap |
| 3 | Add |
| 4 | Sub |
| 5 | Mult |
| 6 | Div |
| 7 | And |
| 8 | Or |
| 9 | Not |
| 10 | Shift Left |
| 11 | Shift Right |
| 12 | Type Cast |
| 13 | Goto |
| 14 | Move |
| 15 | Command |

Data Types are as follows:

| Index | Type Desc. |
|---|---|
| 0 | Byte |
| 1 | Word |
| 2 | Long |
| 3 | Real |
| 4 | Character |

The Receipe Manager™ Module

The Receipe Manager™ module is a programming module residing in the group terminal ESG 400 (Application Receipe Manager 415 of FIG. 2). This module "interprets" and executes program specifications in the description language of the receipes. Part of the interpretation of the program specifications in the receipes includes: 1) looping through the array of receipes (i.e., the Receipe List) to match a "receipe" to a corresponding incoming or outgoing telegram; and 2) reading and "executing" the receipe's description language statements in the receipe memory. "Receipe execution" involves creating "telegrams" meeting required specifications to send to the field devices or process control computers by following the rules of the description language in the receipe, which include blocks and functions. The functions are logical and arithmetic functions on a given data type to construct or recreate a data block per specifications. For example: AND($ESS_{13}$ Status Word, 0x001F)= >Extract drive status for "Status Word."

The Event/Data Handling Module

The event/data handling module interfaces with the Recipe Manager™ module to take care of tasks outside the realm of receipe interpretation such as 1) parsing the raw telegram data to remove protocol-related data; 2) event-handling, i.e., determining as what to do with the raw telegram data based on input from the telegram Attributes; and 3) passing the data to the Receipe Manager™ module. Attributes are pre-defined descriptions for the telegrams from an event-handling standpoint, such as SendOnStartUp, SendOnChange, or SendCyclicallyTimer1. As the event/data handling module parses a telegram, it follows the instructions (defined as "objects") in the pre-defined attributes specifying how to handle a particular telegram given the telegram structure. For example, the event/data handling module determines whether to store the data in the group terminal memory or pass the data to the Receipe Manager™ module.

Attribute specifications are as follows:

| Index | Attribute |
| --- | --- |
| Bit 0 | 0=input telegram/1=output telegram (data direction) |
| Bit 1 | Send on Startup |
| Bit 2 | Send on Fault |
| Bit 3 | Send on Device Failure |
| Bit 4 | Send on Consistency Error |
| Bit 5 | Send on Change of Contents |
| Bit 6 | Not used |
| Bit 7 | Not used |
| Bit 8 | Send cyclic (event source: Timer 1) |
| Bit 9 | Send cyclic (event source: Timer 2) |
| Bit 10 | Send cyclic (event source: Timer 3) |
| Bit 11 | Send cyclic (event source: Timer 4) |
| Bit 12 | Not used |
| Bit 13 | Not used |
| Bit 14 | Not used |
| Bit 15 | Not used |

Limitations: Bits 1 . . . 15 are valid only if Bit 0=1
Implicit Attribute Specifications: Bit 0=1, Bit 15=0 means "Send on Request Only"

3. Implementation

Figure 3:
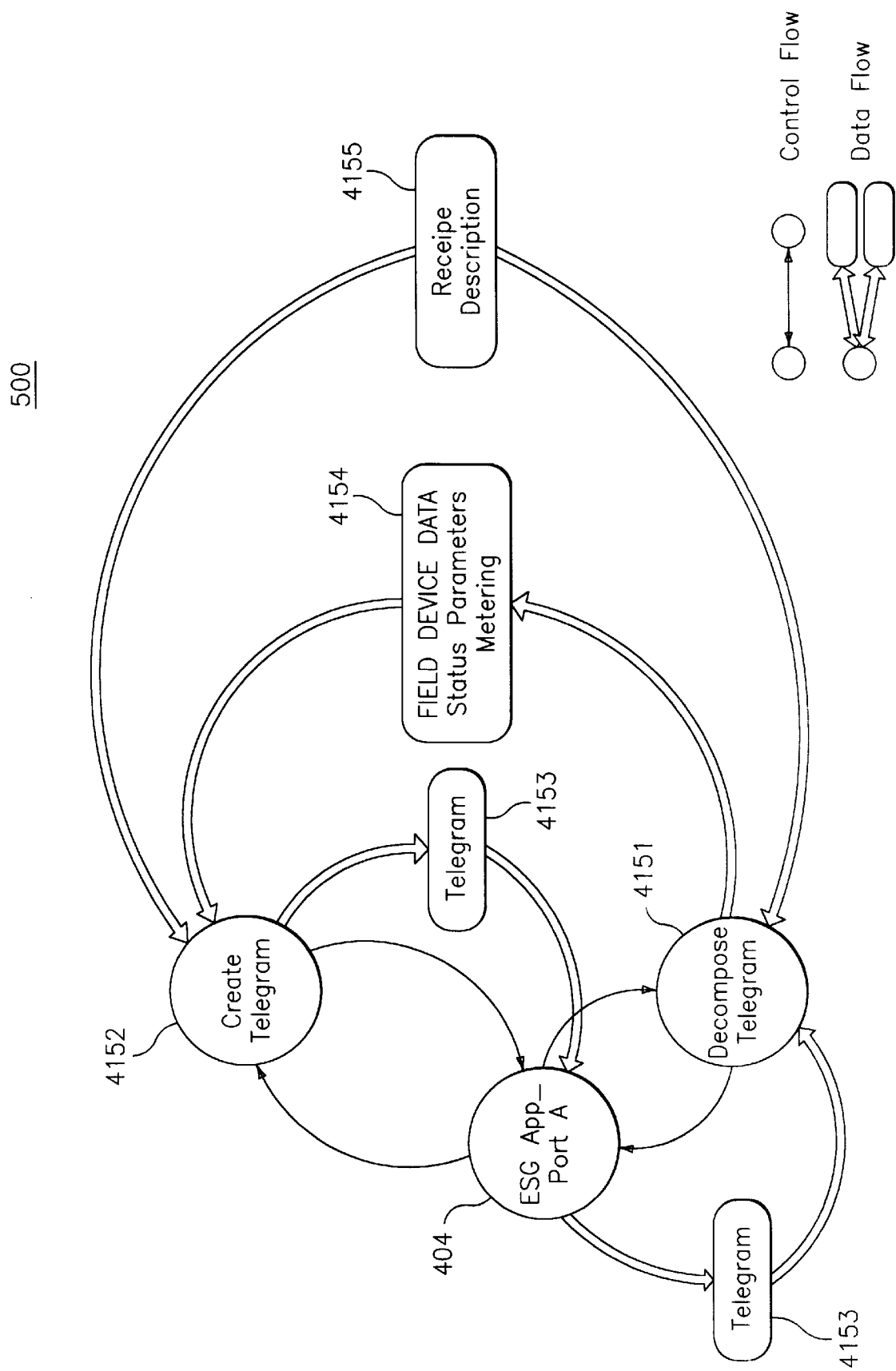
FIG. 3 is a process flow diagram illustrating a dynamic configurable interface.

FIG. 3 is a diagram illustrating the process flow within the Receipe Management Interface system, and between the interface system and the Application Port A 404, connecting the group terminal ESG 400 with the process control computer 350 (FIG. 1). The "raw" data typically includes command instructions or status data from the field device ESS 450 (FIG. 1), customers' specific parameters for the individual protection field devices as entered via Application Port T 401 (FIG. 2), or instructions or data from process control computer 350 through Application Port A 404. The data can be protocol information, variables, data ranges, up to 32 related bit values, or command codes. The variables may include information such as ON/OFF, current readings, and voltage readings, etc. The commands may include functions to be performed such as 'switching ON/OFF', 'showing metering data', 'alarms', and 'changing configuration'. The "raw" data is considered to be "telegrams" by the interface system.

Incoming raw data ("telegrams") 4153 is first decomposed or parsed before being forwarded to the Receipe Manager™ module for further processing. The Receipe Manager™ module 600 interprets and follows the description language in the Receipe Description 4155. For example, Receipe (a) may specify that telegrams 4153 consist of the status block data of each connected field device ESS 450. Receipe (b) may specify that two telegrams to be created, one containing the block data, and one containing the current. Each receipe specifies a protocol to follow, i.e., when and under which circumstances a particular telegram is to be sent from an event handling point-of-view. Given the program rules in the receipe 4155, the Receipe Manager™ module first translates and formats incoming telegrams containing raw data "chunks" into a sequence of data objects, then interprets them. Interpreting the receipe involves identifying the data structure of the telegrams in terms of the data objects. Each object calls for an action by the Receipe Manager module 600 and/or application programs, e.g. Application Port A 404 (FIG. 2) such as storing/retrieving data from/to memory, executing commands, sending data to field devices, entering or erasing alarms.

Given a particular description in the Receipe Description 4155, the Receipe Manager™ module can also apply functions on blocks. One example is for the Receipe Manager™ module to change the representation of a specific block because the plant supervisory management system needs data in a specific structure. For example, creating a SWAP function to change the representation of a current value from an Intel format to a Motorola format and vice versa in an outgoing telegram. As with the incoming raw data, outgoing telegrams also comprise of a sequence of data objects or data blocks, but in a format ready-to-be transmitted to the destination system. Blocks are combined to form telegrams and each block may be used in several telegrams.

Figure 4:
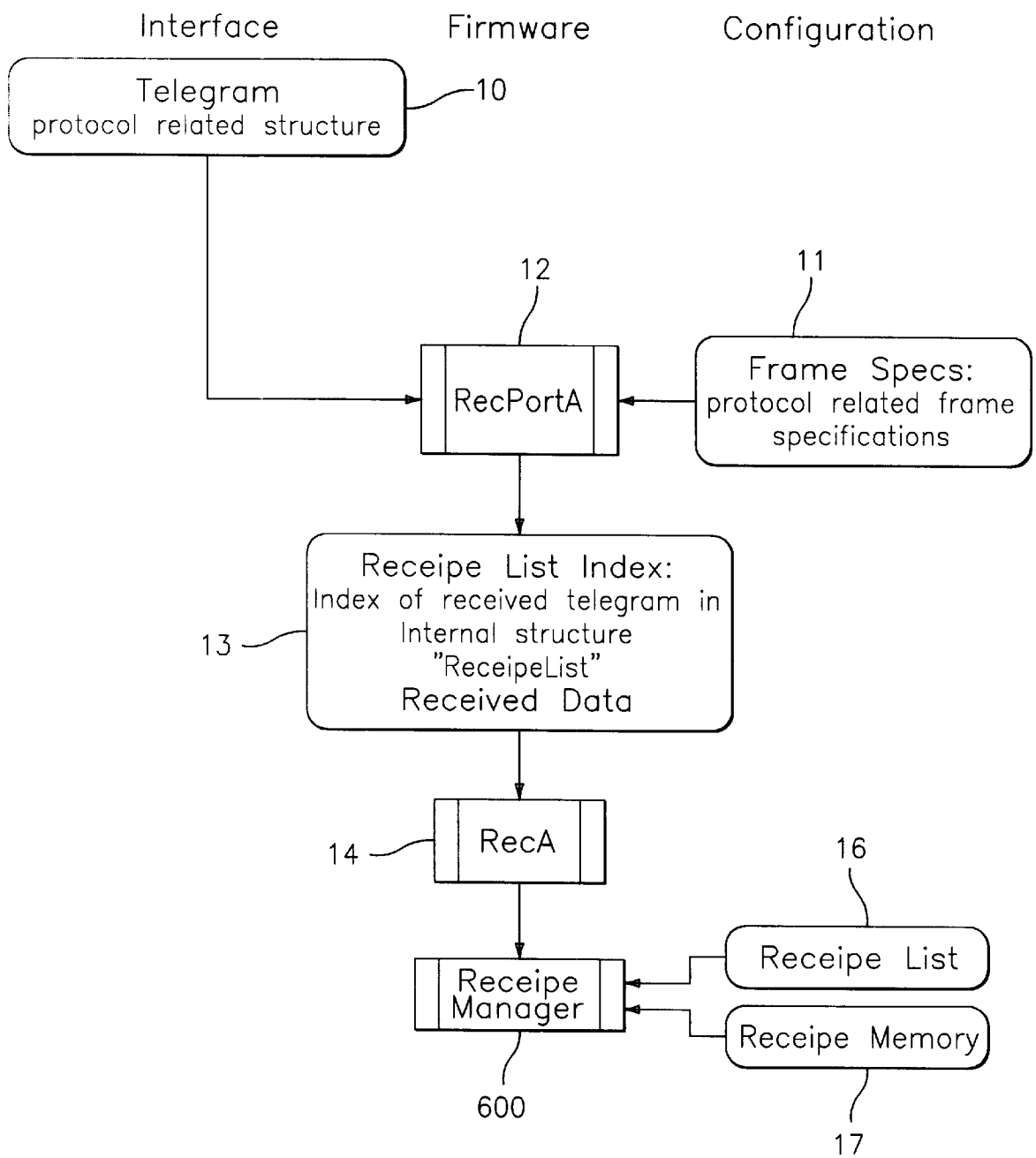
FIG. 4 is a flow chart illustrating the telegram decoding process.

FIG. 4 is a block diagram illustrating the telegram decoding process. Incoming data 10 sent by the field devices is treated as "telegrams" with protocol related structures to the data handling module RecPortA 12. Programming module RecPortA 12 processes the incoming telegram according to the frame specifications in FrameSpecs 11 and removes the frame-related data from the telegrams. Frame specifications are the data bits in a telegram related to a particular protocol, e.g., Modnet1. The incoming data containing telegrams stripped off frame specifications is processed into Received Data and Receipe List Index 13, which is an index of the Receipc List already received in the internal data structure. Receipe List 16 is a data structure for receipe management including telegram ID, pointers to receipe memory, telegram attributes, information for event handling, data access, and error protocol. Programming module RecA 14 parses the Received Data prior sending to Receipe Manager™ module 600. The Receipe Manager™ module 600 interprets and reconstructs the Received Data as "blocks" or "functions" according to the "receipes" or telegram descriptions in the Receipe Memory 17. Receipe List 16 is an index list of the receipes in Receipe Memory 17.

Figure 5:
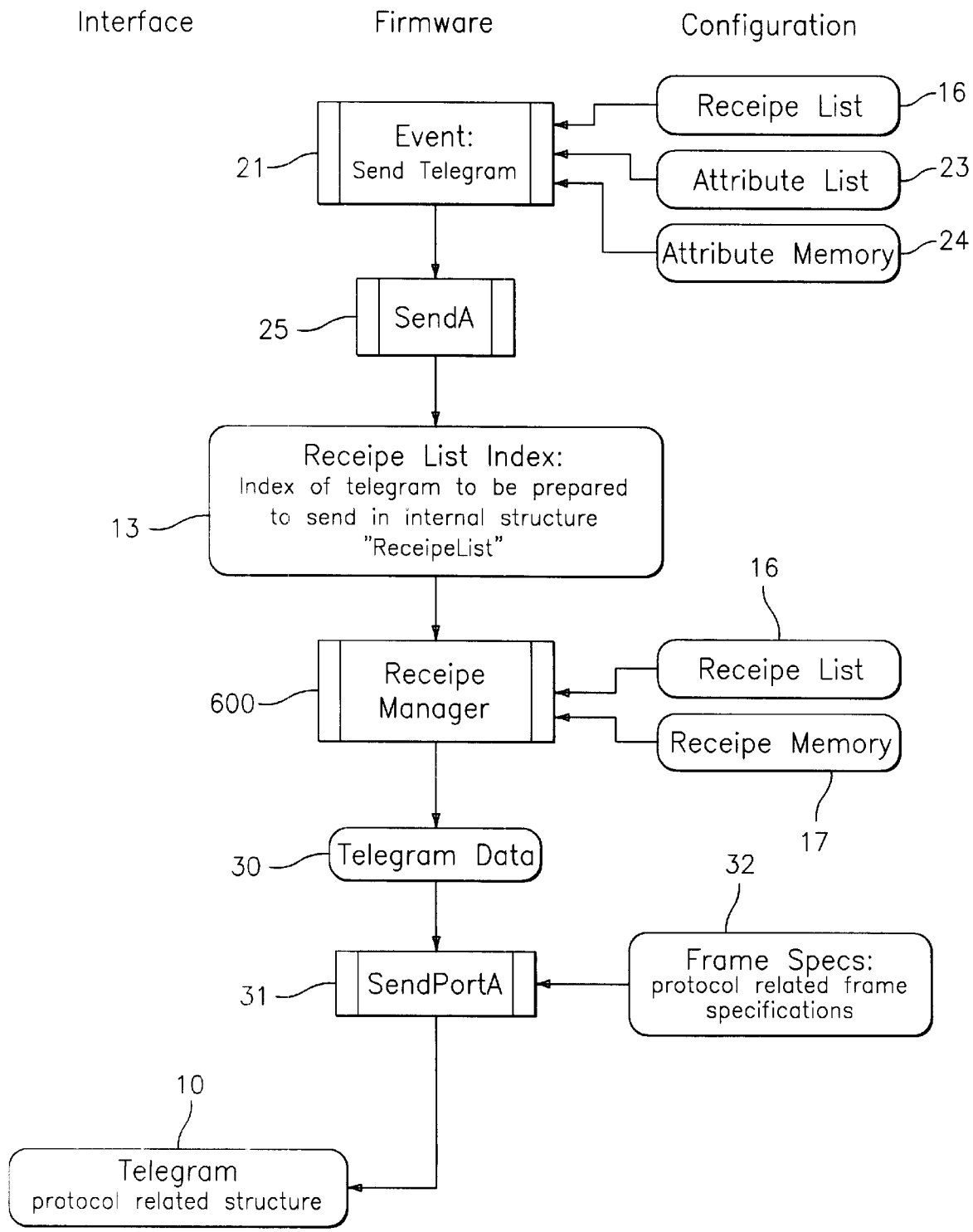
FIG. 5 is a flow chart illustrating coding of the telegrams according to the specifications given in the description language.

FIG. 5 is a block diagram illustrating process of coding or creating telegrams according to the specifications given in the description language of the Receipe. In this exemplary process, the Receipe List 16, Attribute List 23, Attribute Memory 24, and Receipe Memory 17 are global shared data structures. Attribute List is an internal data structure containing attributes for each block useable as "Receipe Ingredients." The internal data structure in the Attribute List is block-oriented for event handling, containing a block ID, attributes, and pointers to the Attribute Memory. The Recipe Ingredients are expressions consisting of blocks and functions specified in the syntax of the description language. Attributes are pre-defined attributes describing the behavior of a data block or a telegram from the point of view of event handling, such as SendOnStartUp, SendOnChange, or SendCyclicallyTimer1. Attribute Memory is an internal data structure carrying lists of telegrams which use the blocks specified by the Attribute List. The data structure is defined for each block used in the telegrams. Attribute Memory is used for fast event handling, e.g., send on change of contents. For each block in Attribute List, there exists one list of telegrams in Attribute Memory.

Input to event-handling module "EVENT: Send Telegram" 21 includes the global-shared Receipe List 16, Attribute List 23, and Attribute Memory 24. From a communications stand-point, this event-handling module 21 decides what to do with the blocks in a telegram given the attributes of the telegram, i.e., when a telegram containing a specific block is to be created and transmitted to other devices. The programming module Event 21 does a check according to specifications given in the Attribute List 23, Attribute Memory 24, and Receipe List 16 as whether the task SendA 25 has to be executed. If yes, SendA 25 computes a Receipe List index 26 and calls the Receipe Manager module 600 with this Receipe List index. The Receipe Manager module 600 then interprets the telegrams based on the specifications given in the description language in the Receipe List 16 and Receipe Memory 17, creating output data Telegram 30. The Telegram Data 30 is sent to function SendPortA 31, which combines the Telegram Data 30 with the Frame Specs 32, which has the protocol-related frame specifications, to generate a Telegram 10 carrying the specific protocol-related structure for a destination computer.

Figure 6A:
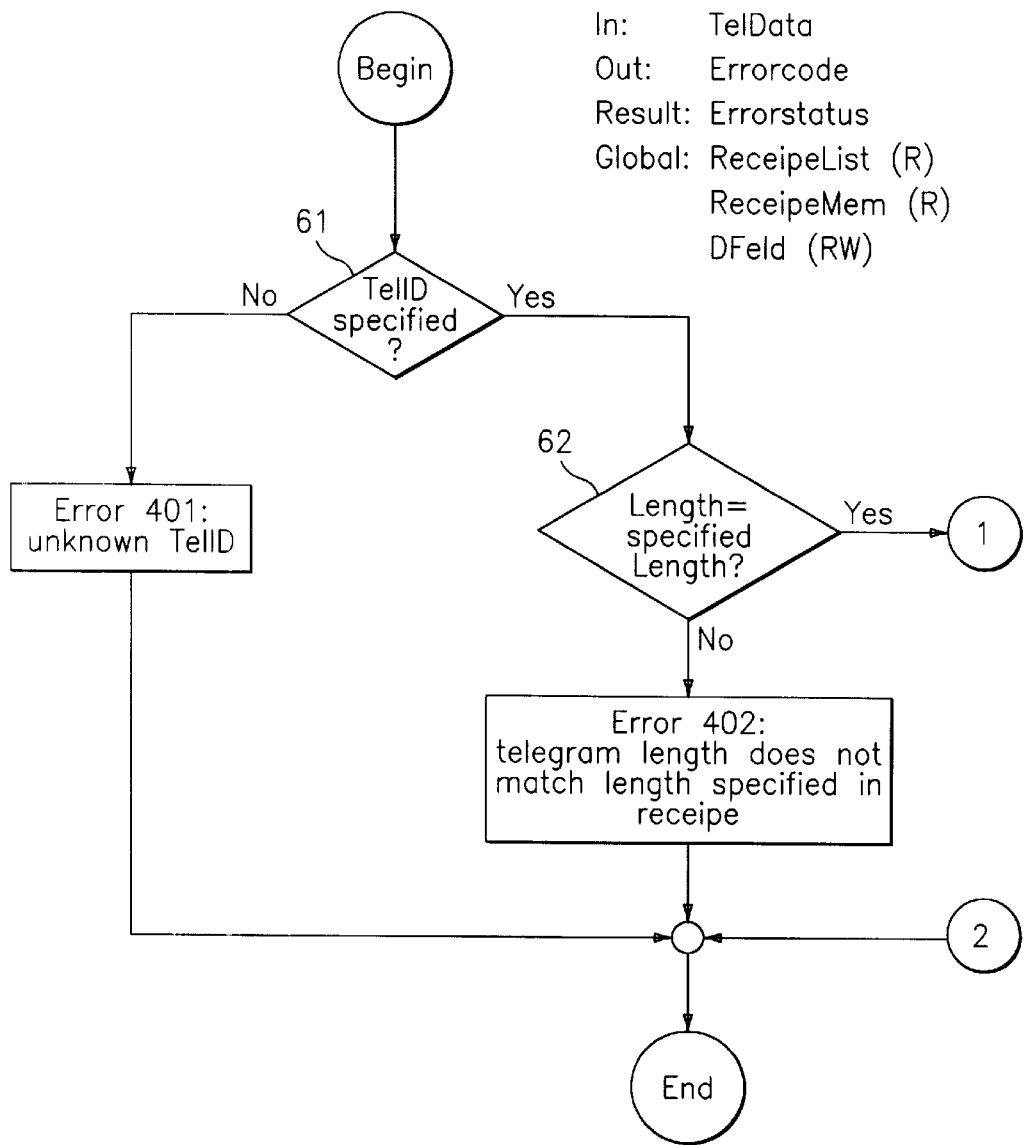
FIGS. 6A and 6B are flow charts illustrating a program function to decompose telegrams.
Figure 6B:
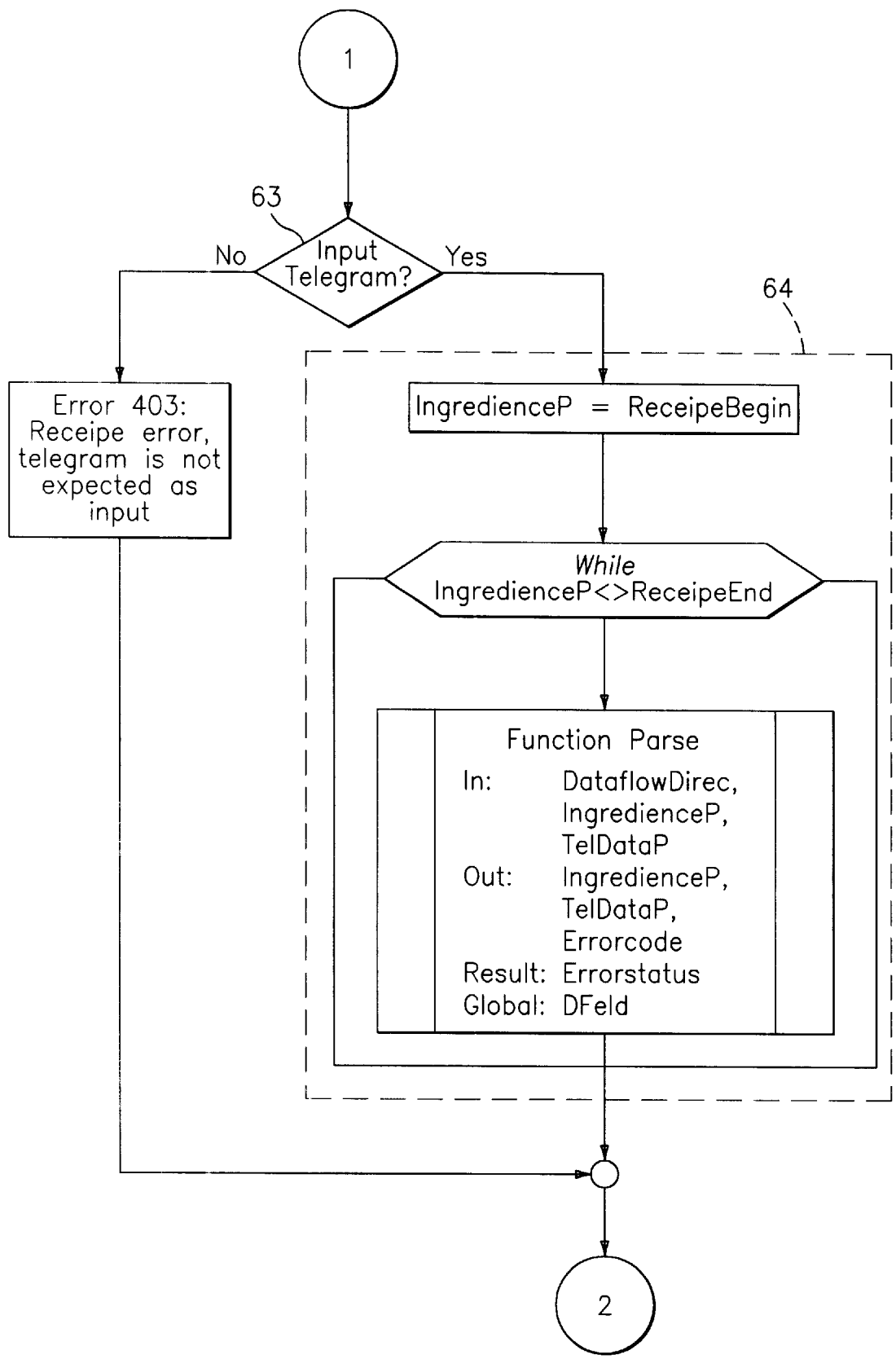

FIGS. 6A and 6B are block diagrams illustrating the major functions in the Reccipe Manager™ module 600 to interpret the rules or telegram description in the Recipe to process incoming data from a connected device. In FIG. 6A, the input to this Receipe Manager™ module is a telegram containing raw data from a connected device, or "TelData." Global data to this module, or to the event/data handling module, includes the Receipe List 16 and the ReceipeMemory 17 containing a list of receipes. Recipe List Index 26 was already created by the RecPortA 12. (In FIG. 4, RecPortA 12 derives a Recipe List Index 26 from FrameSpecs 11, or it sets the Index 26 to "undefined" in case no match to a protocol is found.) By referencing the Recipe List Index 26, the Receipe Manager™ module can retrieve a telegram ID or TelID from the Receipe list 16 and vice versa. The first action 61 by the Receipe Manager™ module is to check to see whether a Telegram ID or "TelID" is defined. TelID identifies the presence of a specific telegram recipe. If TelID is not defined, then an error message 401 is generated indicating that the telegram has to be interpreted according to an unknown receipe. If TelID is specified, the next action 62 is to check whether the telegram length matches a specified length. If it does not, then error message 402 is generated indicating that the telegram length does not match length specified in the receipe. The Error Codes 401 and 402 as mentioned in the flow charts are for internal use only and they can be re-defined at anytime.

In FIG. 6B and in step 63, the Receipe Manager™ module first checks the Recipe List 16 against the TelID to determine the direction of communications, i.e., either the telegrams came from a device or are to be sent to a particular device. If no telegram is input, then error message 403 is generated. If a telegram is input, the next step 64 is looping through all the receipe description language statements in the Receipe Memory 17 to decompose the telegrams.

Figure 7:
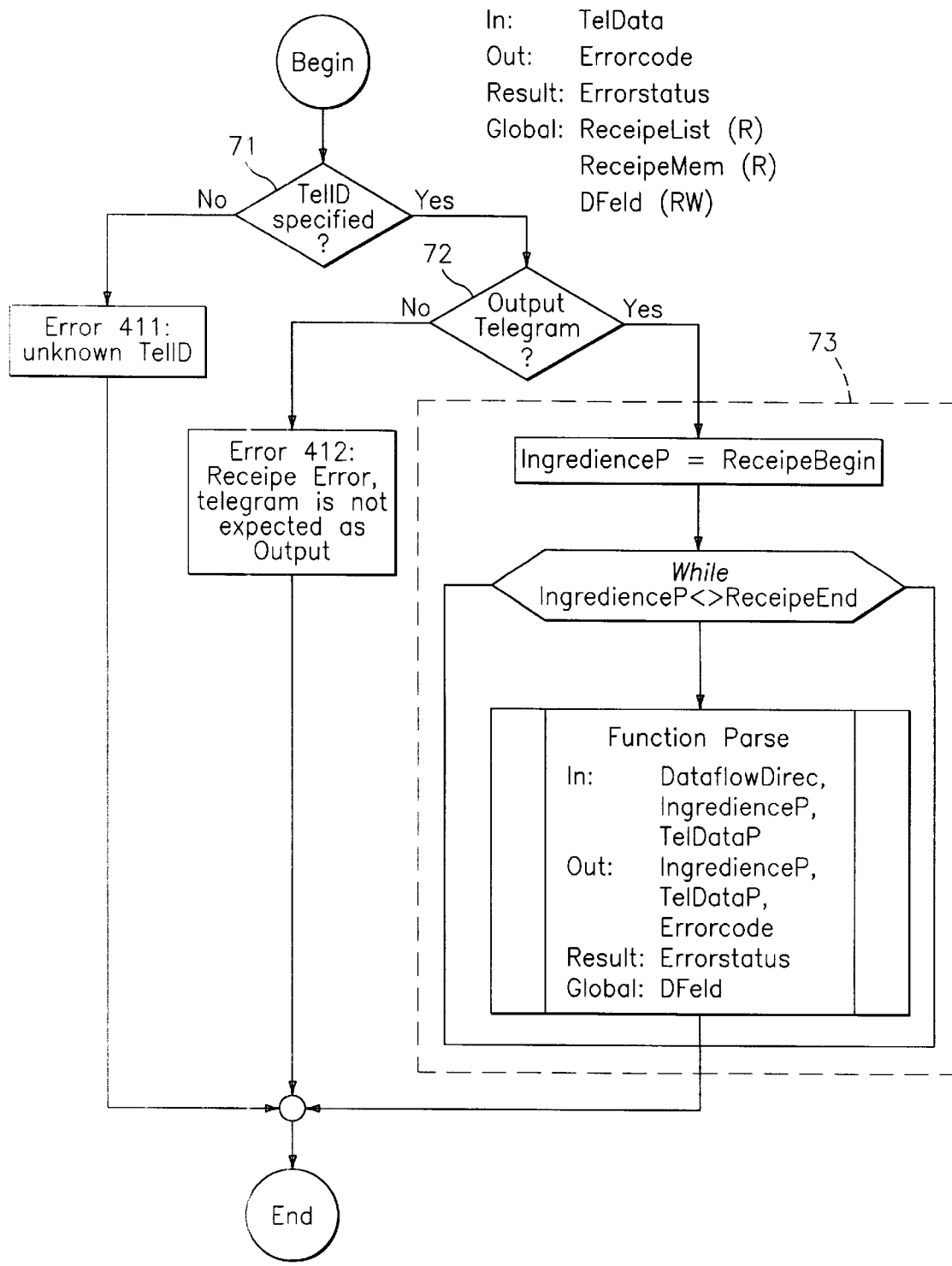
FIG. 7 is a flow chart illustrating a program function to create telegrams.

FIG. 7 is a block diagram illustrating the process of coding or creating telegrams according to the specifications given in the description language in the receipes to send to a process control computer. The Receipe Manager™ module first checks 71 whether a receipe identified by Telegram ID "TelID" resides in the Receipe Memory 17. If it does not, then an error message 411 is generated indicating that no rules are applicable to create the telegram requested. If TelID is specified, then the module checks 72 whether the telegram is to be treated as an output telegram, i.e., to be sent out to a connected field device. If no, then error message 412 is generated. If yes, then the Receipe Manager™ module loops 73 through the receipe description language statements, i.e., receipes, in the Receipe Memory 17 to code or create a telegram for the destination computer. Each telegram is to be constructed containing protocol-specific information for the destination computer. Both the Decompose function (FIG. 6B) and this Create function call the Parse function to process the data in the telegram.

4. Dynamic Configurable Interface System

As explained above, the configurable interface system is a separate and independent part of the firmware. The interface system works with data blocks and primarily handles the data to be exchanged between the field devices and the process control systems. A separate and independent part of the firmware, the communication driver, handles the compatibility of the different fieldbus protocols used in the switchgear system. Communication drivers 412, 413, and 414 (FIG. 2) embed the telegrams created by the Receipe Manager™ module into the protocol frames used by the specific fieldbus protocols. New communication drivers can be freely exchanged or added to the group terminal 350 to support new fieldbus protocols.

In order to expand the capability of the Interface System to accommodate changes in the configuration of the connected process control systems and field devices, or to keep the Interface System up-to-date with the latest system and process enhancements, the firmware is stored in an electronically erasable programmable read only memory (EEPROM) and can be updated with new "receipes" or profiles representing the specific structure/protocol required by the plant supervisory management system or new specifications required by the customers. It can also be updated with new communication drivers to support new fieldbus protocols used in the switchgear system.

Recipes containing standard telegram definitions for common applications or for special integration with a newly available supervisory management system on the market, or customized recipes meeting a specific customer's requirements, can be developed and marketed to dynamically re-configure the interface system of the present invention. The Receipe can be re-configured by field service technicians or by the customer themselves with purchased receipes or profiles representing the latest system enhancements.

In addition, a "new" Receipe may be generated at the customer's site given a purchased software that automatically generates the description language format for the "new" Recipe, given the new data specifications desired by the customers or the specific structure required by the plant supervisory management system.

Figure 8:
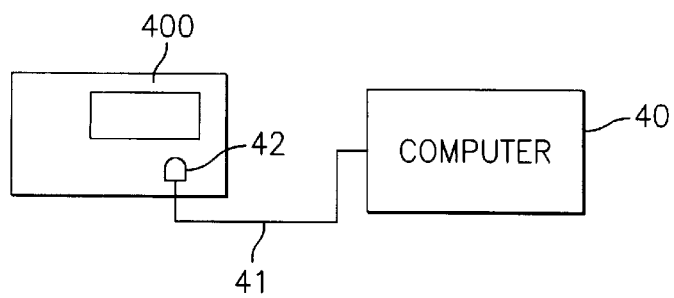
FIG. 8 is a diagrammatic view illustrating reconfiguring the interface system.

FIG. 8 is a diagrammatic view illustrating reconfiguring the interface system. To enable updates in the Interface system as shown in the Figure, group terminal ESG 400 is equipped with an option I/O port 42 connected for communication with a computer 40, e.g., a desktop or laptop type of computer, via a serial data cable or link 41. Serial data cable 41 connects the group terminal ESG 400 to computer 40 via optical I/O port 42. Computer 40 is loaded with an upgrade software program. The user then selects the types of configurations to perform, whether to upload new "recipes" to accommodate new system enhancements or process control systems, or to tailor the data according to the new specifications or protocols. Based on the users' input, the external computer will first generate new/upgraded receipes, or will simply upload a new receipe to the group terminal 400 via the optical port.

By not using a standard interface protocol but by using a standard set of blocks ("data objects") combined with profiles for different types or new releases of field devices such as electronic overload relays, trip units for circuit breakers, meters, etc., as well as different types or new releases of plant supervisory management systems, a family of exchangeable and re-configurable interface systems can be built as gateways for different fieldbus protocols and applications in switchgear applications. The blocks can be shared between different types of field devices. New blocks can be added when new types of field devices are added to the switchgear system. Families of field devices can be created using the same blocks for doing the same tasks. Each type of field devices supported by the Receipe Manager™ interface system is represented by a set of blocks of related information.

The above described dynamic configurable interface systems are built using a novel and efficient "Receipe Manager™" program interpreting process, with the receipes being "programs in programs," comprising of a set of data objects and implemented functions and the Receipe Manager™ system being an interpreter. The syntax of the Receipe language depends on the requirements and the implementation of the computers in the system.

It is to be understood that the above described embodiments are simply illustrative of various embodiments of the invention. Various other modifications and changes may be made by those skilled in the art which will embody the principles of the invention and fall within the spirit and scope thereof.

I claim:

1. A method for interfacing between a plurality of processors in a switchgear system, wherein at least two of the processors have different protocols, said method comprising the steps of:

a. defining an interface specification to govern the data exchange between the processors by the steps of:

defining a list of one or more data blocks which define the characteristics of data coming from each processor, the data blocks comprising objects belonging to one or more object classes;

defining a list of one or more data blocks destined for each processor, the data blocks defined in accordance with the protocol specification of the respective processor and comprising objects belonging to one or more object classes;

defining a list of one or more logical and arithmetic functions to perform on the data blocks, the functions comprising objects belonging to one or more object classes;

combining the data blocks and the functions from a first predetermined list into description statements specifying rules to interpret data coming from each processor;

combining the data blocks and the functions from a second predetermined list into description statements specifying rules to create data destined for and meeting the protocol specification of each processor;

b. creating a first software module to interpret the description statements and execute the rules in the description statements to interpret data coming from each processor and create data destined for and meeting the protocol specification of each processor; and c. creating a second software module to regulate the exchange of data between the processors such that any one of the processors is permitted to send data to or receive data from any other processor via the first software module.

2. The method of claim 1, wherein the definition of the data blocks destined for each processor and meeting the protocol specification of each processor further meets a data format based on a specific user's requirements.

3. The method of claim 1, wherein the definition of the data blocks destined for each processor and meeting the protocol specification of each processor further includes only data selected by a specific user.

4. The method of claim 1, wherein the second software module is also capable of examining the data blocks which define the characteristics of data coming from each processor and depending on the characteristics of the data in the data blocks, the second software module may further dispatch the data blocks to the first software module which interprets the description statements to interpret the data blocks coming from each processor and create data destined for and meeting the protocol specification of each processor.

5. The method of claim 1, wherein the definition of an interface specification to govern the data exchange between the processors further comprises the step of creating a third software module that is capable of communicating with the separate network communication protocols employed by the processors.

6. The method of claim 5, wherein the data blocks defining the characteristics of data from each processor further include frame-related data related to the separate network communication protocols employed by the processors.

7. The method of claim 5, wherein the second software module is further capable of stripping-off the frame related data from the data blocks from each processor before the data blocks are dispatched to the first software module.

8. A system for interfacing between a plurality of processors in a switchgear system, wherein at least two processors have different protocols, said interface system comprising:

a. first means for identifying data from each processor, said first identifying means comprising at least one data block which defines the characteristics of data from each processor, said data block comprising objects belonging to one or more object classes;

b. second means for identifying data destined for each processor, said second identifying means comprising at least one data block which meets the protocol specification of each processor, said data block comprising objects belonging to one or more object classes;

c. third means for identifying at least one logical or arithmetic function to perform on said data blocks, said function comprising objects belonging to one or more object classes;

d. means for combining said data blocks and said functions chosen from a set of predetermined lists into descriptions statements specifying rules to interpret data coming from each processor and to create data destined for and meeting the protocol specification each processor;

e. means for storing said description statements;

f. means for interpreting said descriptions statements to interpret the data from each processor, and to create data destined for and meeting the protocol of each processor; and g. means for regulating the exchange of data between processors.

9. The system of claim 8, further comprising:

means for examining the data coming from each processor and dispatching said data to be interpreted and created into data destined for and meeting the protocol specification of at least one of the processors.

10. The system of claim 8, further comprising:

means for displaying messages resulting from said exchange of data between processors.

11. The system of claim 8, further comprising:

means for allowing users to input changes in parameters of at least one of the processors.

12. The system of claim 8, further comprising:

means for regulating the communication flow between the fieldbus protocols of the processors in the switchgear application.

* * * * *